US007962165B2

(12) United States Patent
Straub

(10) Patent No.: US 7,962,165 B2
(45) Date of Patent: Jun. 14, 2011

(54) COMBINED GLOBAL POSITIONING SYSTEM RECEIVER AND RADIO

(75) Inventor: Henry J. Straub, Olathe, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 12/763,362

(22) Filed: Apr. 20, 2010

(65) Prior Publication Data

US 2010/0203849 A1    Aug. 12, 2010

Related U.S. Application Data

(63) Continuation of application No. 11/551,184, filed on Oct. 19, 2006, now Pat. No. 7,729,684, which is a continuation of application No. 10/002,573, filed on Nov. 1, 2001, now Pat. No. 7,142,900.

(51) Int. Cl.
*H04B 7/00* (2006.01)
(52) U.S. Cl. .................................. 455/518; 455/404.2
(58) Field of Classification Search .................. 455/418, 455/419, 404.2, 414.2, 425
See application file for complete search history.

(56) References Cited

U.S. PATENT DOCUMENTS

| | | | |
|---|---|---|---|
| 3,063,048 A | 11/1962 | Lehan et al. |
| 4,021,807 A | 5/1977 | Culpepper et al. |
| 4,131,849 A | 12/1978 | Freeburg et al. |
| 4,296,408 A | 10/1981 | Neuringer |
| 4,445,118 A | 4/1984 | Taylor et al. |
| 4,459,667 A | 7/1984 | Takeuchi |
| 4,475,010 A | 10/1984 | Huensch et al. |
| 4,593,273 A | 6/1986 | Narcisse |
| 4,651,157 A | 3/1987 | Gray et al. |
| 4,675,656 A | 6/1987 | Narcisse |
| D291,288 S | 8/1987 | Suzuki |
| 4,750,197 A | 6/1988 | Denekamp et al. |
| 4,809,005 A | 2/1989 | Counselman, III |
| D301,882 S | 6/1989 | Watanabe |
| D302,271 S | 7/1989 | Watanabe |
| 4,884,132 A | 11/1989 | Morris et al. |
| 4,891,650 A | 1/1990 | Sheffer |
| 4,907,290 A | 3/1990 | Crompton |

(Continued)

FOREIGN PATENT DOCUMENTS

EP    0 061 674    10/1982

(Continued)

OTHER PUBLICATIONS

"Application of the Global-Positioning System (GPS) to Automatic Vehicle Monitoring"- 1981 Carnahan Conference on Crime Countermeasures, University of Kentucky, Lexington, May 13-15, 1981.

(Continued)

*Primary Examiner* — Tu X Nguyen
(74) *Attorney, Agent, or Firm* — Samuel M. Korte

(57) ABSTRACT

A portable GPS/radio unit (10) communicates over a wireless radio network (12) with at least one other such unit. The unit (10) may transmit radio signals over the network (12) indicative of the unit's location. The unit (10) includes a single, push-to-talk button (38) that may be pressed to both transmit a voice communication and to initiate transmission of location data. The unit (10) also includes a "polling" function that requests location data from other units, an auxiliary coding system that codes or encrypts all transmitted data, and an emergency message feature that facilities the transmission and receipt of emergency messages.

9 Claims, 2 Drawing Sheets

U.S. PATENT DOCUMENTS

| | | |
|---|---|---|
| 4,912,756 A | 3/1990 | Hop |
| 4,953,198 A | 8/1990 | Daly et al. |
| 4,972,479 A | 11/1990 | Tobias, Jr. et al. |
| D312,650 S | 12/1990 | Charrier |
| 4,977,399 A | 12/1990 | Price et al. |
| D314,713 S | 2/1991 | Ciranny et al. |
| 5,021,794 A | 6/1991 | Lawrence |
| 5,043,736 A | 8/1991 | Darnell et al. |
| 5,055,851 A | 10/1991 | Sheffer |
| D326,450 S | 5/1992 | Watanabe |
| 5,119,504 A | 6/1992 | Durboraw, III |
| 5,144,323 A | 9/1992 | Yonkers ........................ 342/386 |
| 5,146,231 A | 9/1992 | Ghaem et al. |
| 5,155,689 A | 10/1992 | Wortham |
| 5,172,110 A | 12/1992 | Tiefengraber |
| 5,193,215 A | 3/1993 | Olmers |
| 5,202,829 A | 4/1993 | Geier |
| 5,208,756 A | 5/1993 | Song |
| 5,218,367 A | 6/1993 | Sheffer et al. |
| 5,219,067 A | 6/1993 | Lima et al. |
| 5,223,844 A | 6/1993 | Mansell et al. |
| D337,582 S | 7/1993 | Lewo |
| 5,235,633 A | 8/1993 | Dennison et al. |
| 5,245,314 A | 9/1993 | Kah, Jr. |
| 5,265,150 A | 11/1993 | Helmkamp et al. |
| 5,289,195 A | 2/1994 | Inoue |
| 5,299,132 A | 3/1994 | Wortham |
| 5,301,368 A | 4/1994 | Hirata |
| 5,307,277 A | 4/1994 | Hirano |
| 5,315,636 A | 5/1994 | Patel |
| 5,323,164 A | 6/1994 | Endo |
| 5,327,144 A | 7/1994 | Stilp et al. |
| 5,334,974 A | 8/1994 | Simms et al. |
| 5,341,410 A | 8/1994 | Aron et al. |
| 5,345,244 A | 9/1994 | Gildea et al. |
| 5,355,511 A | 10/1994 | Hatano et al. |
| 5,361,212 A | 11/1994 | Class et al. |
| 5,364,093 A | 11/1994 | Huston et al. |
| 5,365,450 A | 11/1994 | Schuchman et al. |
| 5,379,224 A | 1/1995 | Brown et al. |
| 5,389,934 A | 2/1995 | Kass |
| 5,408,238 A | 4/1995 | Smith |
| 5,414,432 A | 5/1995 | Penny, Jr. et al. |
| 5,422,816 A | 6/1995 | Sprague et al. |
| 5,434,789 A | 7/1995 | Fraker et al. |
| 5,438,518 A | 8/1995 | Bianco et al. |
| 5,448,773 A | 9/1995 | McBurney et al. |
| D363,488 S | 10/1995 | Shumaker |
| 5,469,175 A | 11/1995 | Boman |
| D365,032 S | 12/1995 | Laverick et al. |
| D365,292 S | 12/1995 | Laverick et al. |
| 5,493,309 A | 2/1996 | Bjornholt |
| 5,506,587 A | 4/1996 | Lans |
| 5,513,183 A | 4/1996 | Kay et al. |
| 5,519,403 A | 5/1996 | Bickley et al. |
| 5,528,248 A | 6/1996 | Steiner et al. .................. 342/357 |
| 5,539,398 A | 7/1996 | Hall et al. |
| 5,555,286 A | 9/1996 | Tendler |
| 5,557,606 A | 9/1996 | Moon et al. |
| 5,570,095 A | 10/1996 | Drouilhet, Jr. et al. |
| 5,581,259 A | 12/1996 | Schipper |
| 5,592,382 A | 1/1997 | Colley |
| 5,650,770 A | 7/1997 | Schlager et al. |
| 5,654,718 A | 8/1997 | Beason et al. |
| 5,689,269 A | 11/1997 | Norris |
| 5,689,809 A | 11/1997 | Grube et al. |
| 5,712,899 A | 1/1998 | Pace |
| 5,742,666 A | 4/1998 | Alpert |
| 5,781,150 A | 7/1998 | Norris |
| 5,786,789 A | 7/1998 | Janky |
| 5,797,091 A | 8/1998 | Clise et al. |
| 5,804,810 A | 9/1998 | Woolley et al. |
| 5,826,195 A | 10/1998 | Westerlage et al. |
| 5,831,545 A | 11/1998 | Murray et al. ........... 340/825.49 |
| 5,848,373 A | 12/1998 | DeLorme et al. |
| 5,877,724 A | 3/1999 | Davis |
| 5,890,070 A | 3/1999 | Hamada |
| 5,892,441 A | 4/1999 | Woolley et al. |
| 5,902,347 A | 5/1999 | Backman et al. |
| 5,914,675 A | 6/1999 | Tognazzini |
| 5,929,752 A | 7/1999 | Janky et al. |
| 5,938,721 A | 8/1999 | Dussell et al. |
| 5,952,959 A | 9/1999 | Norris |
| 5,959,529 A | 9/1999 | Kail, IV |
| 5,963,130 A | 10/1999 | Schlager et al. |
| 6,002,982 A | 12/1999 | Fry |
| 6,005,513 A | 12/1999 | Hardesty |
| 6,009,375 A | 12/1999 | Sakumoto et al. |
| 6,011,510 A | 1/2000 | Yee et al. |
| 6,028,537 A | 2/2000 | Suman et al. |
| 6,046,688 A | 4/2000 | Higashikata et al. |
| 6,052,597 A | 4/2000 | Ekstrom |
| 6,085,090 A | 7/2000 | Yee et al. |
| 6,111,539 A | 8/2000 | Mannings et al. |
| 6,124,826 A | 9/2000 | Garthwaite et al. |
| 6,133,853 A | 10/2000 | Obradovich et al. ......... 340/905 |
| 6,144,336 A | 11/2000 | Preston et al. |
| 6,148,261 A | 11/2000 | Obradovich et al. |
| 6,148,262 A | 11/2000 | Fry |
| 6,166,626 A | 12/2000 | Janky et al. |
| 6,166,698 A | 12/2000 | Turnbull et al. |
| 6,182,006 B1 | 1/2001 | Meek |
| 6,236,338 B1 | 5/2001 | Hamada |
| 6,236,358 B1 | 5/2001 | Durst et al. |
| 6,240,276 B1 | 5/2001 | Camp, Jr. |
| 6,246,376 B1 | 6/2001 | Bork et al. |
| 6,266,612 B1 | 7/2001 | Dussell et al. |
| 6,275,707 B1 | 8/2001 | Reed et al. |
| 6,278,402 B1 | 8/2001 | Pippin |
| 6,295,449 B1 | 9/2001 | Westerlage et al. |
| 6,297,781 B1 | 10/2001 | Turnbull et al. |
| 6,347,278 B2 | 2/2002 | Ito |
| 6,366,771 B1 | 4/2002 | Angle et al. |
| 6,373,430 B1 | 4/2002 | Beason et al. ........... 342/357.09 |
| 6,374,179 B1 | 4/2002 | Smith et al. |
| 6,389,291 B1 | 5/2002 | Pande et al. |
| 6,411,899 B2 | 6/2002 | Dussell et al. |
| 6,421,608 B1 | 7/2002 | Motoyama et al. |
| 6,430,498 B1 | 8/2002 | Maruyama et al. |
| 6,434,485 B1 | 8/2002 | Beason et al. |
| 6,437,696 B1 | 8/2002 | Lemelson et al. ......... 340/573.4 |
| 6,453,236 B1 | 9/2002 | Aoki |
| 6,456,938 B1 | 9/2002 | Barnard |
| 6,459,371 B1 * | 10/2002 | Pike ........................... 340/539.1 |
| 6,470,267 B1 | 10/2002 | Nozaki |
| 6,492,941 B1 | 12/2002 | Beason et al. |
| 6,496,709 B2 | 12/2002 | Murray |
| 6,496,777 B2 | 12/2002 | Tennison et al. |
| 6,504,503 B1 | 1/2003 | Saint-Hilaire et al. |
| 6,518,919 B1 | 2/2003 | Durst et al. |
| 6,529,824 B1 | 3/2003 | Obradovich et al. |
| 6,556,899 B1 | 4/2003 | Pachet et al. |
| 6,646,603 B2 | 11/2003 | Dooley et al. |
| 6,765,528 B2 | 7/2004 | Tranchina et al. |
| 6,768,450 B1 | 7/2004 | Walters et al. |
| 6,774,795 B2 | 8/2004 | Eshelman et al. |
| 6,791,477 B2 | 9/2004 | Sari et al. |
| 6,816,782 B1 | 11/2004 | Walters et al. |
| 6,819,258 B1 | 11/2004 | Brown ..................... 340/825.49 |
| 6,850,188 B1 | 2/2005 | Lee et al. |
| 6,871,144 B1 | 3/2005 | Lee |
| 7,013,158 B1 | 3/2006 | Cook ........................... 455/519 |
| 7,016,687 B1 | 3/2006 | Holland ..................... 455/456.1 |
| 7,099,921 B1 | 8/2006 | Engstrom et al. ............. 709/206 |
| 7,142,900 B1 | 11/2006 | Straub ......................... 455/701 |
| 7,196,659 B1 | 3/2007 | Beason et al. ............. 342/357.1 |
| 2001/0026240 A1 | 10/2001 | Neher ..................... 342/357.07 |
| 2002/0004704 A1 | 1/2002 | Nagatsuma et al. |
| 2002/0006806 A1 | 1/2002 | Kinnunen et al. |
| 2002/0028702 A1 | 3/2002 | Kim |
| 2002/0049529 A1 | 4/2002 | Ikeda |
| 2002/0063655 A1 | 5/2002 | Aoyama |
| 2002/0070881 A1 | 6/2002 | Marcarelli et al. ............ 340/988 |
| 2002/0102989 A1 | 8/2002 | Calvert et al. |
| 2002/0128774 A1 | 9/2002 | Takezaki et al. |
| 2002/0169551 A1 | 11/2002 | Inoue et al. |
| 2002/0173909 A1 | 11/2002 | Verbil |

| | | | |
|---|---|---|---|
| 2002/0190861 | A1 | 12/2002 | Wentworth ................ 340/568.1 |
| 2002/0193945 | A1 | 12/2002 | Tan et al. |
| 2002/0198020 | A1 | 12/2002 | Mooney |
| 2002/0198659 | A1 | 12/2002 | Doyle et al. |
| 2003/0040322 | A1 | 2/2003 | Lection et al. ................ 455/456 |
| 2003/0080897 | A1 | 5/2003 | Tranchina et al. |
| 2003/0092433 | A1 | 5/2003 | Flannery |
| 2003/0139150 | A1 | 7/2003 | Rodriguez et al. |
| 2004/0155815 | A1 | 8/2004 | Muncaster et al. |

FOREIGN PATENT DOCUMENTS

| | | |
|---|---|---|
| EP | 0 123 562 | 10/1984 |
| EP | 0 242 099 | 4/1987 |
| FR | 2 541 801 | 2/1983 |
| JP | 10319396 | 12/1998 |

OTHER PUBLICATIONS

"Automatic Vehicle Monitoring" by J.S. Bravman et al., Fairchild Space & Electronics, Co., Germantown, MD (published prior to Oct. 11, 2002).

"AX.25 Amateur Packet-Radio Link-Layer Protocol", Version 2.2, Nov. 1997 from http://www.tapr.org.

"Tendler Updates FoneFinder", Jun. 28, 1999 *Wireless Week*.

APRS Guide—"The Automatic Position Reporting System", compiled from a series of articles by Arte Booten, from http://www.oarc.net, printed May 22, 2002.

NavTalk Cellular Phone/GPS Receiver: Owner's Manual and Reference Guide, Garmin Corporation, Jan. 2000.

\* cited by examiner

COMBINED GLOBAL POSITIONING SYSTEM RECEIVER AND RADIO

RELATED APPLICATIONS

This application is a continuation of, and claims priority benefit of, U.S. patent application Ser. No. 11/551,184, entitled "COMBINED GLOBAL POSITIONING SYSTEM RECEIVER AND RADIO", filed Oct. 19, 2006, which in turn is a continuation of, and claims priority benefit of, U.S. patent application Ser. No. 10/002,573, now U.S. Pat. No. 7,142,900, entitled "COMBINED GLOBAL POSITIONING SYSTEM RECEIVER AND RADIO", filed Nov. 1, 2001. The above-identified applications are incorporated herein by specific reference.

BACKGROUND OF THE INVENTION

1. Field of the Invention

The present invention relates to radios and global positioning system (GPS) receivers. More particularly, the invention relates to a combined GPS receiver and radio unit operable for sending GPS-derived data and other information to other such units.

2. Description of the Prior Art

The global positioning system (GPS) is an electronic satellite navigation system which permits users to determine their position with respect to the Earth. Global positioning may be determined with a handheld GPS receiver which detects and decodes signals from a number of satellites orbiting the Earth. The signals from each of these satellites indicate the position of the satellite and the time at which the signals were sent. To decode the satellite signals, known as spread spectrum signals, and thereby calculate desired position and navigational data, a GPS receiver must first "find" or acquire the signals emitted from a minimum number of satellites. Once the receiver is "locked on" to the spread spectrum signals, the user's global position and other navigational data (e.g., velocity of movement) can be calculated.

In addition to the growing popularity and demand for GPS navigational devices, portable two-way radios continue to enjoy widespread popularity. In 1996, the Federal Communications Commission (FCC) established the Family Radio Service (FRS) so that families and other small groups could communicate with one another over very short distances (typically less than two miles) at no charge and without an FCC license. The FRS, which is one of the Citizens Band Radio Services, includes 14 channels in the UHF 465 MHz band. There are a number of commercially available two-way radios which are designed for use with the FRS.

The increasing use of both portable radios and GPS receivers has led to proposals to incorporate the two into combined units. It is anticipated that such combined units will provide enhanced capabilities such as the ability to transmit GPS-derived location data between two or more units so that the users of the units may monitor each other's location. For example, a family may use several of these combined units to not only communicate with one another but also to monitor each other's location so that parents may keep track of their children.

Unfortunately, currently-proposed combined GPS/radio units suffer from several limitations that limit their utility. For example, proposed designs for combined GPS/radio units include, in addition to the typical controls found on GPS receivers and FRS radios, numerous other buttons that must be operated to trigger the transmission of location data between the units. Those skilled in the art will appreciate that such additional buttons complicate operation and increase costs of the units.

Another limitation of currently-proposed combined GPS/radio units is that location data is only transmitted from a first unit to other units when the user of the first unit elects to do so. This is a problem because users often wish to know the location of other users, even if these other users forget to transmit such information. For example, parents may wish to monitor the location of their children, but only may do so with currently-proposed units if the children periodically transmit their location information back to their parents.

Another limitation of currently-proposed combined GPS/radio units and FRS radios in general is their lack of privacy. Because the FRS is an unlicensed, shared communication service, communications from several different groups of people are often transmitted at the same time, causing interference. This is especially true in areas where FRS radio use is popular, such as in amusement parks, sporting events, concerts, etc. Such interference can be avoided to a certain extent by selecting between 14 available FRS channels, but often, some or all of the channels are used simultaneously. Also, once members of a group have selected a channel and separated from one another, it is difficult to get all of the members to simultaneously switch to a different channel.

To prevent FRS radio users from hearing unwanted radio transmissions, many FRS radios incorporate continuous tone coded squelch systems (CTCSS). A CTCSS controls the audio output of a radio so that users only hear desired communications. A CTCSS includes circuitry for generating and a selector for selecting between a number of sub-audible tones, one of which is transmitted any time a radio is operating in the CTCSS mode. Other radios with a CTCSS that receive the transmission will disable their squelch and therefore enable audio output if they have been set to the same sub-audible tone. The radios will not disable their squelch for communications that are transmitted with a different or no CTCSS sub-audible tone.

Unfortunately, many people incorrectly assume that a CTCSS prevents others from listening to their conversations. In fact, a CTCSS only prevents a user from hearing unwanted conversations, but does not prevent others from listening to the user's conversations. Radios that do not have a CTCSS or that have a CTCSS that is turned off can receive and hear all communications transmitted in their vicinity. For example, a group of users may enable the CTCSS on their radios and communicate with one another without hearing communications from other people. However, users of other radios without a CTCSS or with a CTCSS that is not enabled may listen to all of groups' communications. The same is true for transmitted location data. For example, with prior art combined GPS/radio units, unauthorized persons may intercept transmitted location data and use such data to improperly monitor the location of other radio users.

Another limitation of currently-proposed combined GPS/radio units and FRS radios in general is that it is sometimes difficult to transmit and receive emergency messages. FRS rules require users to give priority to emergency messages; however, FRS channels are frequently so crowded that emergency messages cannot be heard or are interfered with. Moreover, users of radios with a CTCSS as described above cannot hear an emergency message unless the CTCSS on their radios is turned off or tuned into the same sub-audible tone transmitted with the emergency message.

Accordingly, there is a need for an improved combined GPS/radio unit that overcomes the limitations of the prior art.

SUMMARY OF THE INVENTION

The present invention solves the above-described problems and provides a distinct advance in the art of radios in general, and combined GPS/radio units in particular. One embodiment of the present invention provides a radio with a single push-to-talk button or other input device that can be used to initiate transmission of both a voice communication and data. The radio is preferably a combined GPS/radio unit, and the data is preferably GPS-derived location data. When a user pushes the push-to-talk button, location data for the unit is automatically transmitted either before or after the button is released. This combines two important functions in one input device to reduce the complexity and cost of the unit. This also results in the automatic transmission of location data every time the user transmits a voice communication.

Another embodiment of the present invention provides a radio with a "polling" function. Particularly, the radio includes a pushbutton switch or other input device that may be pressed to transmit a radio signal requesting that other users transmit data indicative of their locations. The "polling" request may be simply displayed on the other units or may cause the units to automatically transmit their location data. This "polling" function allows users of the units to monitor each other's location even if some of the users forget to transmit their location data.

A similar embodiment of the present invention provides a radio that periodically automatically transmits a radio signal indicative of its location without requiring a user to initiate the transmission. This allows a group of radio users to automatically transmit and receive updated location information without action from the users.

Another embodiment of the present invention provides a radio having an auxiliary coding system that codes all transmitted location data to prevent unauthorized persons from intercepting the location data and using such data to improperly monitor the location of the radio. The auxiliary coding system may be used alone or in conjunction with a CTCSS.

Another embodiment of the present invention includes an emergency message feature wherein one CTCSS sub-audible tone is reserved for emergency communications. All radios with this feature have the same CTCSS tone reserved for emergency communications so that any time an emergency communication is transmitted, all radios in range receive the emergency communication and unmute their radios. The emergency sub-audible tone may be selected from one of the radio's existing sub-audible tones or may be a new, dedicated emergency sub-audible tone.

The inventive features of each of the radios described above are preferably implemented in a combined GPS/radio unit; however, they may also be implemented in other radio and communications devices. Also, although each of the radios described above preferably communicate over the FRS, they may also communicate over other wireless networks.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 3 is a block diagram of a communications network linking the GPS/radio unit of FIG. 1 with a plurality of other GPS/radio units.

Figure 1:
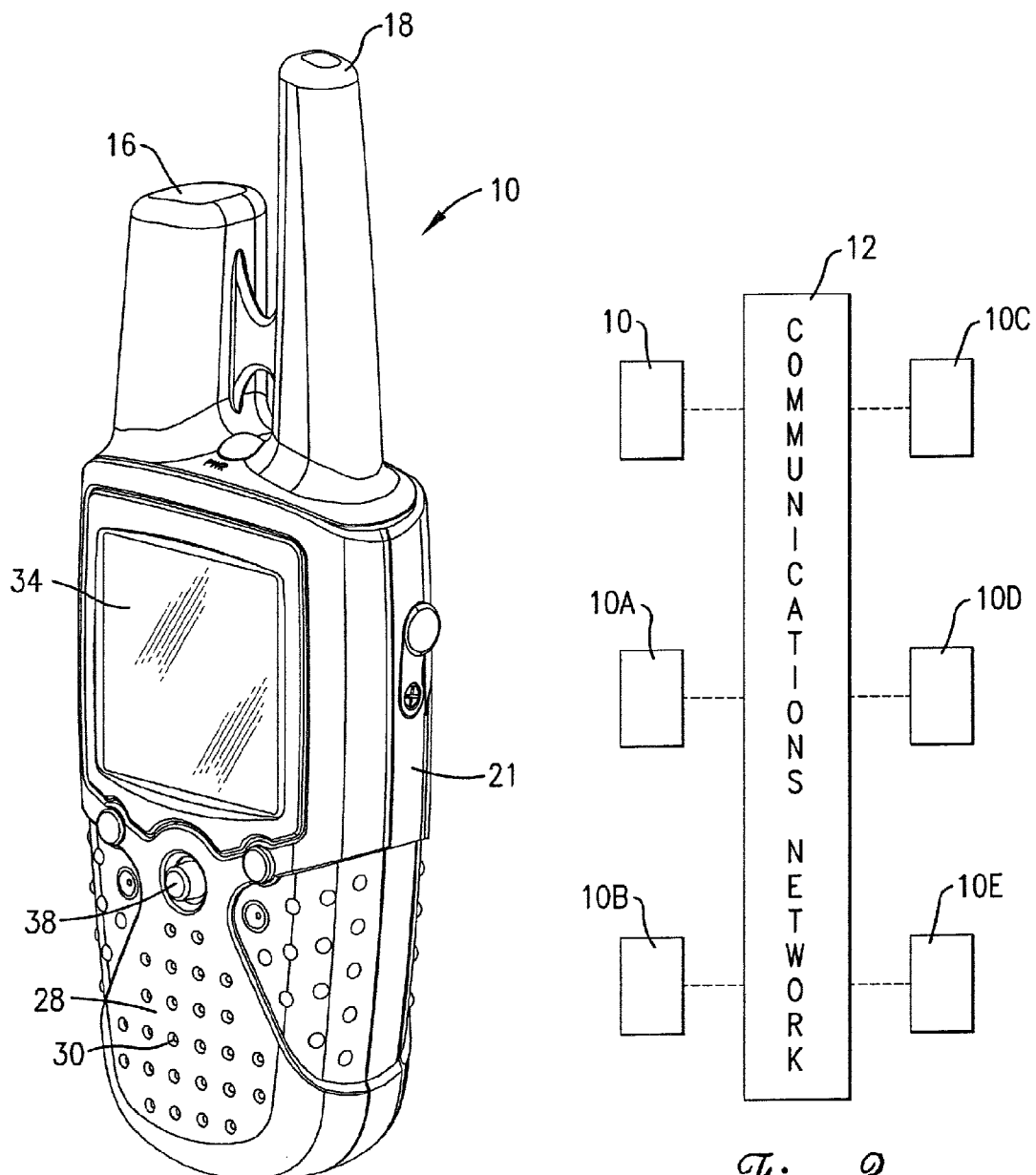
FIG. 1 is a perspective view of a combined GPS/radio unit constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIGS. 1 and 3, a portable radio 10 constructed in accordance with a preferred embodiment of the invention is illustrated. The radio 10 is preferably a combined GPS/radio unit that may transmit and receive voice communications, determine its location using the GPS, and transmit location data to other such units 10A, 10B, 10C, 10D and 10E over a wireless network 12. In the preferred embodiment of the present invention, units 10 and 10A-10E communicate with one another over a public radio network such as the Family Radio Service. While six units 10 and 10A-10E are shown on the exemplary embodiment of FIG. 3, only two such units are necessary for the purposes of the present invention.

Figure 2:
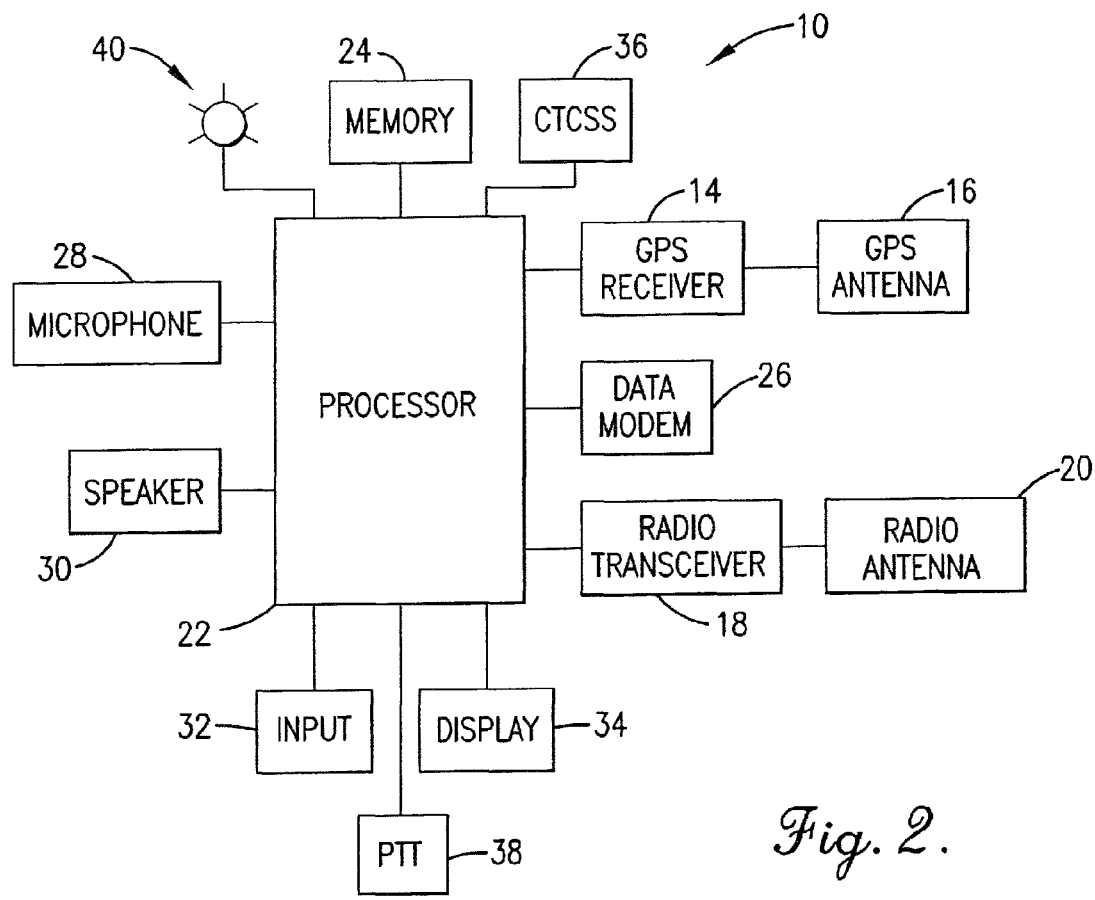
FIG. 2 is a block diagram of the components of the GPS/radio unit of FIG. 1.

Referring to FIGS. 1 and 2, the preferred unit 10 comprises a GPS receiver 14, a GPS antenna 16, a radio transceiver 18, and a radio antenna 20 all mounted in or on a radio housing 21. The GPS receiver 14 is electronically coupled with a processor 22 which has an associated memory 24 for storing information such as cartographic data (i.e., electronic maps). Similarly, the radio transceiver 18 is coupled with the processor 22 and a data modem 26. The data modem is used for transmitting and receiving data such as location data as described herein. The cartographic data may be stored on cartridges which can be removably attached to the unit 10. For example, an electronic map of a particular city or national park may be stored in a single cartridge. The memory 24 may also store historical location data for the unit 10 or for other units which have transmitted location data to unit 10. The antennas 16, 20 preferably extend upwardly from the top of the housing 21.

The unit 10 also includes a microphone 28, a speaker 30, an input 32, and a display 34. The microphone 28 and the speaker 30 are conventional and may be, for example, the same type of microphone and speaker equipped with a standard FRS radio. The display 34 is preferably a liquid crystal display (LCD) and is used to display location information and cartographic data as described in more detail below.

The input 32 is preferably an alphanumeric keypad, such as a telephone keypad, which may be used to select and input a name or other identifier for the unit 10 using any combination of the letters, numbers, or symbols which are available on the keypad. The keypad may include any number of control buttons such as the twelve buttons standard on a telephone keypad. As will be understood, the input 32 could be something other than a keypad, such as a microphone/voice recognition input, a touch screen, or a menu-driven display input.

The unit 10 also includes a continuous tone coded squelch system (CTCSS) 36 and a push-to-talk button 38. The CTCSS 36 controls the audio output of the speaker 30 so that only certain desired communications are heard by a user of the unit 10. The CTCSS 36 includes circuitry for creating a plurality of sub-audible tones and a selector for selecting one of the tones. The selector may be a key or button on the input 32 or a dedicated key or button positioned elsewhere on the unit 10. When enabled, the CTCSS 36 transmits the selected sub-audible tone with all voice communications. Other nearby units 10A-10E will receive the sub-audible tone along with all transmitted voice communications and disable their squelch if they have a similar CTCSS 36 that has been set to the same sub-audible tone. This allows a group of users to set their units to the same sub-audible tone and then communicate with one another without hearing communications transmitted by radios with a different or no CTCSS 36 sub-audible tone. However, as described above, other radios with no CTCSS 36 or with a CTCSS 36 that is turned off will still be able to listen to all communications transmitted over the FRS.

The push-to-talk button 38 may be any conventional push-button switch or other control device normally found on FRS radios and operable to transmit voice communications. However, in accordance with one important aspect of the present invention, the push-to-talk button 38 is coupled with the processor 22 to combine two important functions in a single button. Specifically, the push-to-talk button 38 is operable to both initiate transmission of voice communications and transmission of a radio signal indicative of a GPS-derived location of the unit.

When a user presses the push-to-talk button 38 and begins speaking into the microphone 28, the radio transceiver 18 begins transmitting a voice communication along with the selected CTCSS 36 sub-audible tone in a conventional manner. Pressing the push-to-talk button 38 also triggers the transmission of a radio signal with GPS-derived location data indicative of the location of the unit 10. By combining both functions in a single input device, operation of the unit 10 is simplified. Moreover, this arrangement allows updated location data to be automatically transmitted each time the user transmits a voice communication. The push-to-talk button 38 may also initiate transmission of data other than the location data.

In preferred forms, the location data or other data is transmitted after the push-to-talk button 38 has been pushed and then released so that the data does not interfere with transmitted voice communications. In this embodiment, the processor 22 preferably keeps the radio transceiver 18 enabled for a pre-determined time interval after the push-to-talk button 38 has been released to permit transmission of the location data. For example, the radio transceiver 18 may remain enabled to transmit the location data for approximately 100-300 milliseconds after the push-to-talk button 38 has been released. This provides ample time for transmitting the location data while minimizing any possibility that the user will interfere with transmission of the location data by pressing the push-to-talk button 38 too quickly.

Similarly, if the unit 10 is receiving a voice communication and a corresponding CTCSS 36 sub-audible tone from another unit, the processor 22 keeps the radio transceiver 18 enabled for a pre-determined amount of time after the processor detects loss of the received CTCSS 36 sub-audible tone so that the radio transceiver 18 may continue listening for location data from the other unit. The pre-determined time interval is preferably the same as when the radio transceiver 18 is transmitting location data (i.e., 100-300 milliseconds).

In another embodiment of the push-to-talk feature, the location data is transmitted immediately after the push-to-talk button 38 is first pressed. In this embodiment, the processor 22 and the radio transceiver 18 preferably transmit the location data within a pre-determined time after the push-to-talk button 38 has been pressed to minimize interference with subsequent voice communications. The pre-determined time may be, for example, 100-300 milliseconds.

In another embodiment of the invention, the unit 10 includes a "polling" function that enables a user of the unit 10 to request location information from the other units 10A-10E. Particularly, the unit 10 includes a button or other input device coupled with the processor 22 that may be pressed or otherwise operated to cause the unit 10 to transmit a radio signal over the network requesting the other units 10A-10E to transmit location data over the network. The polling button or input device may be a key or keys on the input 32 or may be a dedicated key or button positioned elsewhere on the unit 10. The "polling" request may be displayed on the other units or may cause the other units to automatically transmit their location over the network 12 so that the unit 10 and all other units may receive it.

In another similar embodiment of the invention, the unit 10 may be configured to automatically send a radio signal indicative of its location over the network 12 at periodic intervals. This feature enables all units 10, 10A-10E to automatically receive updated location data from the other units without user action.

In another embodiment of the invention, the unit 10 includes an auxiliary coding system that codes or encrypts all location data prior to transmission. The auxiliary coding system may use any known coding or encryption scheme such as public or private key encryption methods. For example, a group of radio users may each enter an agreed-upon 8-bit code into their radios prior to use. The processor 22 then uses the 8-bit code to encrypt transmitted location data and to decrypt received data. The auxiliary coding system is preferably used in conjunction with the CTCSS 36 described above to prevent a user of the unit 10 from hearing unwanted conversations and to prevent unauthorized persons from intercepting transmitted location data. Thus, a user of the unit 10 wishing to transmit a message first selects a desired channel, then a CTCSS 36 sub-audible tone, and finally an encryption code. This provides several layers of security or privacy that together prevent users from hearing unwanted communications and prevent unauthorized persons from improperly tracking the locations of other radio users. This embodiment of the invention may be particularly useful for groups of users who are particularly concerned with privacy, such as law enforcement groups.

In another embodiment of the invention, the unit 10 includes an emergency message feature that makes it easier for users to transmit and receive emergency messages. The emergency message feature reserves one of the CTCSS 36 sub-audible tones for emergency communications. The CTCSS 36 of the units 10, 10A-10E are always tuned to this emergency sub-audible tone as well as any other tones selected for normal voice communications. Thus, any time an emergency communication is transmitted, all radios in range of the message will receive the message and unmute their speakers even if their CTCSS 36 is set to another sub-audible tone for regular, non-emergency messages. The emergency sub-audible tone may be selected from one of the radio's existing sub-audible tones or could be a new, dedicated emergency sub-audible tone.

The emergency message feature also preferably includes an emergency call indicator 40 coupled with the processor 22.

The emergency call indicator is actuated each time the processor 22 senses receipt of the emergency sub-audible tone to alert the user that an emergency message is about to be received. The emergency call indicator 40 may be an indicator light, tone, vibration device, or any other device capable of alerting a user of receipt of an emergency call.

In use, the unit 10 communicates with other GPS/radio units (e.g., units 10A-10E) over the wireless network 12 in the same manner that conventional two-way radios communicate with one another. In addition, these units are able to calculate their location and communicate that location data to one another since they are also equipped with GPS receivers. Transmission of the location data may be triggered by the push-to-talk button 38 as described above. Another way to communicate the location data over the wireless network 12 is to divide the available bandwidth into a voice portion and a data portion so that voice and data may be communicated simultaneously. If only a small portion of the bandwidth is allocated for data transmission, there should be no noticeable degradation of the voice communication. Alternatively, the entire communication channel could be used for voice communication except for periodic interruptions during which a burst of location data is sent. If the period of the interruption is short, there should be no noticeable effect on the quality of the voice communication. The data may be transmitted using one of a variety of different modulation techniques, including frequency shift keying (FSK), minimum shift keying (MSK), or phase shift keying (PSK).

Figure 4:
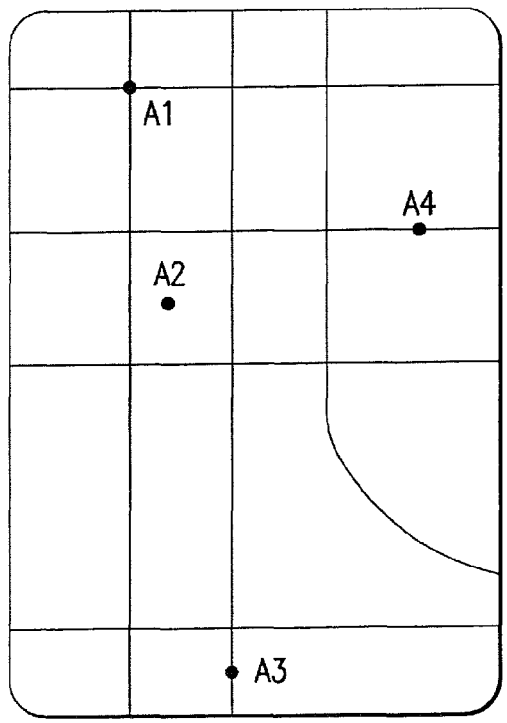
FIG. 4 is a schematic representation of a display on the GPS/radio unit of FIG. 1, wherein the display indicates the location of multiple GPS/radio units on an electronic map.

FIG. 4 is a schematic representation of an exemplary display 34 on the unit 10 in which the display 34 indicates the location of four different GPS/radio units. Although darkened circles are used in FIG. 4 to indicate the location of the four units, any other location designator could be used. The display 34 also indicates a unique alphanumeric identifier for each of the four units. For example, the identifiers A1, A2, A3, and A4 may correspond to units 10A, 10B, 10C, and 10D, in which case the location of unit 10 would not be shown. Alternatively, the identifier A1 may correspond to unit 10 and the identifiers A2-A4 may correspond to units 10A-10C so that the location of unit 10 is shown on its display 34. While alphanumeric identifiers were selected in the example of FIG. 4, any available identifier (or combination of identifiers) could be used (e.g., letters, numbers, symbols, icons, colors, etc.) for the units. Moreover, an identifier could perform the dual function of identifying the unit and of indicating the location of the unit, thus eliminating the need for a darkened circle or other such location designator.

There are many practical applications which could utilize the advantages of the present invention. For example, if a family or other small group is camping or hiking and each person is carrying a GPS/radio unit, then everyone can communicate with one another and see where everyone else is located. Since each person's position would be indicated on the electronic map displayed on each of the units, the other members of the group could quickly locate a member who becomes lost or injured. This would also be the case if the group is located in an urban or residential area.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

The invention claimed is:

1. A portable GPS/radio unit capable of communicating with at least one other portable GPS/radio unit over a wireless radio network, the GPS/radio unit comprising:
   a GPS receiver for receiving satellite signals from a plurality of satellites;
   a processor coupled with the GPS receiver for calculating a location of the GPS/radio unit as a function of the satellite signals;
   a radio transceiver coupled with the processor and operable for—
      transmitting voice communications to and receiving voice communications from the other GPS/radio unit, and
      transmitting a radio signal to the other GPS/radio unit indicative of the location of the GPS/radio unit and receiving from the other GPS/radio unit a radio signal indicative of a location of the other GPS/radio unit; and
   a push-to-talk button coupled with the radio transceiver and the processor for initiating transmission of both the voice communications and the radio signal indicative of the location of the GPS/radio unit,
   wherein the radio signal indicative of the location of the GPS/radio unit is transmitted after the push-to-talk button has been pushed and released so that the radio signal indicative of the location of the GPS/radio unit is transmitted after transmission of the voice communications.

2. The portable GPS/radio unit of claim 1, wherein the radio transceiver continues to be enabled to transmit the radio signal indicative of the location of the GPS/radio unit for a pre-determined amount of time after the push-to-talk button has been released.

3. The portable GPS/radio unit of claim 1, further including a display coupled with the processor for displaying the location of the GPS/radio unit and the location of the other GPS/radio unit on cartographic data.

4. The portable GPS/radio unit of claim 1, wherein the wireless radio network comprises a Family Radio Service (FRS) network.

5. A method comprising:
   receiving at a portable GPS/radio unit satellite signals from a plurality of satellites;
   calculating a location of the portable GPS/radio unit as a function of the satellite signals; and
   transmitting from the portable GPS/radio unit both a voice communication and a radio signal indicative of the location of the portable GPS/radio unit when a push-to-talk button on the portable GPS/radio unit is actuated,
   wherein the radio signal indicative of the location of the portable GPS/radio unit is transmitted after the push-to-talk button has been pushed and released so that the radio signal indicative of the location of the portable GPS/radio unit is transmitted after transmission of the voice communication.

6. The method of claim 5, further including transmitting the radio signal indicative of the location of the GPS/radio unit a pre-determined amount of time after the push-to-talk button has been released.

7. The method of claim 5, further including visually presenting the location of the GPS/radio unit and the location of the other GPS/radio unit on a cartographic map displayed by the GPS/radio unit.

8. The method of claim 5, wherein the transmission from the portable GPS/radio unit is made using a Family Radio Service (FRS) network.

9. A portable GPS/radio unit capable of communicating with at least one other portable GPS/radio unit over a wireless radio network, the GPS/radio unit comprising:
- a housing;
- a GPS receiver positioned in the housing for receiving satellite signals from a plurality of satellites;
- a GPS antenna coupled with the GPS receiver and extending substantially upward from the housing;
- a processor positioned in the housing and coupled with the GPS receiver for calculating a location of the GPS/radio unit as a function of the satellite signals;
- a radio transceiver positioned in the housing and coupled with the processor and operable for—
  transmitting voice communications to and receiving voice communications from the other GPS/radio unit, and
  transmitting a radio signal to the other GPS/radio unit indicative of the location of the GPS/radio unit and receiving from the other GPS/radio unit a radio signal indicative of a location of the other GPS/radio unit;
- a radio antenna coupled with the radio transceiver and extending substantially upward from the housing; and
- a push-to-talk button positioned on the housing and coupled with the radio transceiver and the processor for initiating transmission of both the voice communications and the radio signal indicative of the location of the GPS/radio unit,
wherein the radio signal indicative of the location of the GPS/radio unit is transmitted after the push-to-talk button has been pushed and released so that the radio signal indicative of the location of the GPS/radio unit is transmitted after transmission of the voice communications.

* * * * *